Patented May 7, 1929.

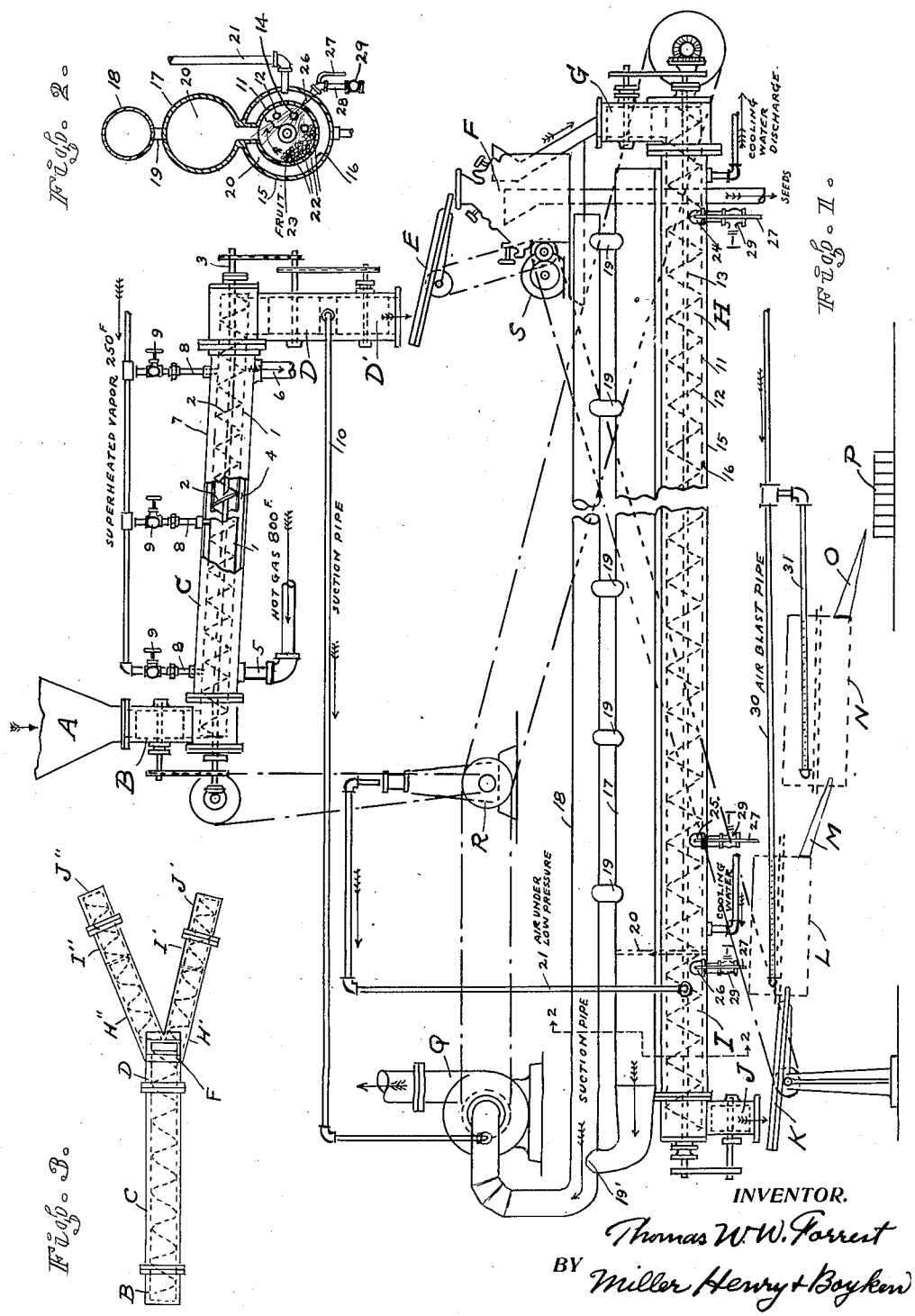

1,711,729

UNITED STATES PATENT OFFICE.

THOMAS W. W. FORREST, OF OAKLAND, CALIFORNIA, ASSIGNOR TO SUN MAID RAISIN GROWERS OF CALIFORNIA, OF FRESNO, CALIFORNIA, A COOPERATIVE ASSOCIATION OF CALIFORNIA.

PROCESS FOR TREATING FRUITS, ESPECIALLY RAISINS.

Application filed June 17, 1925. Serial No. 37,676.

This invention relates to processes for treating dried fruits, especially raisins and particularly seeded raisins.

The principal object of the invention is to provide a process for treating dried fruits which will result in a better product than the product of the processes heretofore used, and the process herein described may be considered as constituting improvements over the "method of treating raisins" etc., described in my co-pending application filed January 12, 1925 under Serial No. 1951.

When applied to dried stemmed raisins my improved process briefly described comprises the following steps.

1st. A rapid intense superficial heating of the outer skins of the raisins while subjecting them also to the action of a superheated vapor of low humidity at substantially atmospheric pressure.

2nd. A rapid seeding of the thus heated raisins.

3rd. A gentle progressive cooling.

4th. A rapid terminating cooling close to air temperature.

5th. An aeration to bring the raisins to uniform temperature throughout.

6th. A treatment with a tasteless mineral oil (such as oil of petrolatum) during step 3 and preferably also at the beginning of step 4.

This complete process differs from my earlier disclosure referred to principally by the steps 1-3-5 and 6.

Suitable apparatus to carry out the process is shown in the accompanying drawings in more or less diagrammatic form, as other applications are being filed by me on the apparatus for this improved process under Serial Numbers 37,677 and 37,678, and since this application refers to the process apart from the apparatus the following description of the apparatus will be no more than necessary to show the carrying out of the process.

In the drawings, Figure 1 is a side elevation of the complete equipment receiving the dried stemmed raisins at the upper end and delivering the processed seeded raisins for boxing or packing at the lower end.

Figure 2 is an enlarged cross section of the lower or hot fruit cooling and treating member along the line 2—2 of Figure 1.

Figure 3 is a diagrammatic reduced plan view of a modified arrangement of the principal apparatus members with the lower member shown as bifurcated into two of half length.

Generally described the elements shown in Figure 1 are:

A—a hopper from a supply bin of dry raisins in the condition as received from the cap-stemmer.

B—a rotary gate for feeding the raisins into,

C—the upper member or heat treating portion of the apparatus wherein the raisins are very rapidly heated and subjected to superheated vapor.

D—and D'—a pair of rotary gates delivering the heated treated raisins to,

E—a shaker feed table delivering the raisins to,

F—a standard seeding machine.

G—a rotary gate delivering the seeded raisins to the lower member or,

H—the first part of the hot fruit cooling and oil treating portion of the apparatus.

I—the final or rapid cooling section of the lower member and wherein the raisins are again oil treated.

J—a rotary gate delivering the cooled raisins to,

K—a shaker feed table delivering the raisins to,

L—a rotary screen or aerating drum for evenly cooling the raisins by a blast of air.

M—a chute delivering the raisins from L to,

N—a second rotary screen aerating drum.

O—a second chute delivering the finally aerated raisins to,

P—receptacles of any kind in which the final product is packed.

Q—is a vacuum pump operated by an air engine.

R—the air engine for operating the moving portions of the apparatus at proper interrelated speeds, and the exhaust air of which constitutes an expanding gas or refrigerant conveniently used for the rapid cooling of the raisins in section I of the lower member.

Attention is called to the fact that upper member C and lower member H—I are closed cylindrical containers and the gates B, D, D', G and J at the ends of the containers are of the revolving paddle wheel type or any other which will deliver the fruit to and from the cylinders without permitting the heat or gases to escape, and these valves are suitably driven by transmission elements as indicated so as to have the proper capacity for the installation.

The seeding machine is driven preferably by an independent electric motor as indicated at S, and which is conveniently also used to drive the two shaker feed tables E and K.

Having now in mind a clear picture of the correlated functions of the different pieces of apparatus and the path of the raisins therethrough, a detailed description of the upper and lower members will be entered upon.

The upper member is shown with part of its forward wall broken away to reveal the interior, and it consists of two cylinders, one within the other with a space between them. These cylinders are inclined slightly for drainage as shown and are sealed from one another so as not to communicate, and within the inner one 1 is mounted a spiral conveyor 2 with its shaft 3 extending for bearing support and actuation through both heads of the cylinder as indicated.

To the space 4 between the cylinders extends a pipe 5 through which heated gas or other fluid is delivered at a temperature of about 800° F. to emerge after circulation in the space from a pipe 6 returning preferably to the heating apparatus for the gas (not shown).

Extending through the outer cylinder shell 7 and space 4 and communicating only with the upper portion of the space within the inner cylinder are pipes 8 controlled by valves 9 through which superheated vapor is conveyed to the inner cylinder.

This vapor is preferably steam superheated to about 250° F. and of little or no pressure above atmospheric pressure, consequently is of very low humidity, in fact is practically a gas as it is not ordinarily visible if exhausted to the atmosphere.

The dry raisins enter the inner cylinder in a continuous stream through the feeder gate B and are rapidly conveyed along by the spiral conveyor 2 and ejected by the gate D all while maintaining the cylinder in sealed relation to the outer atmosphere.

The speed of travel of the raisins through the apparatus is very fast, in practice requiring about 12 seconds to pass them through a 10 foot heated cylinder, and the constant agitation or rolling around of the raisins by the spiral conveyor against the 800 degree hot inner shell prevents scorching of the fruit while producing an intense heating action greater on the exterior of the raisins and is similar to flashing them through a flame yet without burning them.

During this rapid passage of the fruit the superheated vapor penetrates and softens the fruit bodies, yet owing to the relative dryness of the vapor, without developing any superfluous moisture in the fruit, and moreover, the combination of rapid outer flashing of the fruit and application of dry steam of the nature mentioned combined with the duration of the treatment results in a fruit body quite distinct from that ordinarily produced in steaming apparatus for in the case of raisins the bodies assume a puffed up condition so that their bulk is from 16 to 20% greater than the same grade of raisins steamed in the ordinary manner.

This puffed up condition appears to be quite permanent as the bodies are resilient and quickly recover after passing through the seeding machine, and in addition the treatment preserves a higher sugar content and produces a raisin of utmost homogeneity, in fact a raisin so treated seems to have no line of demarcation between skin and flesh and may be torn to pieces without the skins separating.

Owing to the very rapid passage of the raisins through the superheated vapor of from 230 to 250 degrees and over the hot plate of 800 degrees the general temperature of the raisins is only raised to about 142° F. at the time of discharge.

After the raisins are discharged from gate D they are subject to the action of an exhaust pipe 10 to remove any surplus vapor not absorbed, and are then passed out of gate D' to the shaker table E which feeds them to the seeder F, from which they enter through the gate G to the first part H of the lower member.

This lower member is about three times as long as the upper member and consists of an inner cylindrical shell 11 in which revolves a spiral conveyor 12 mounted on a shaft 13 extending through both heads of the shell for bearings and driving similar to the construction of the upper member described.

The conveyor is perforated with holes 14 of about 1⅛ inches in diameter spaced a few inches apart, as indicated in Figure 2 of the drawing, and the inner shell 11 is surrounded by an outer shell 15 with a space 16 between the shells.

Above the outer shell 15 extends another cylinder 17 of about the same diameter and forming a header, and communicating with the interior of the inner cylinder along its entire length (see Figure 2), while above the header extends a large suction pipe 18 communicating with the header at spaced points 19 and 19'.

For a relatively short distance from the discharge end the outer shell 15 and header 17 are cut by a vertical wall 20 so as to provide a long zone H of initial cooling treatment and a shorter zone I of final rapid cooling treatment.

In the long zone H the intershell space 16 is gently cooled by a circulation of water at about atmospheric temperature, and the vapor and heat is exhausted from the inner shell and raisins through the header 17, so as to effect a gentle reduction of the raisin temperature, while in the shorter zone I the raisins are very rapidly further cooled to substantially room temperature by a refrigerant preferably air under low pressure as received from the exhaust of the air engine R and which air enters the intershell space of zone I through pipe 21 and passing through a series of perforations 22 in the inner shell expands directly amongst the raisin bodies, after which it is drawn off by the exhaust pipe 18 through the connection 19' of the short portion of header 17.

Figure 2 shows the relation of perforations 22 to the raisins 23, the latter being banked up to one side of the shell 11 due to the rotation of the conveyor are directly over the perforations so as to receive the full blast of expanding air or other refrigerant through them.

During the cooling of the raisins they are treated preferably at several stages of the cooling, to an atomized spray of mineral oil, such as "Orinite," or oil of petrolatum.

This atomization of oil is preferably delivered at the points 24, 25 and 26 directly against the raisins while being agitated and conveyed along.

Figure 2 indicates one of the atomizers 26 with an oil supply pipe 27 and an air pipe 28 extending therefrom controlled by a valve 29.

In practice very little of the oil is used, the quantity being about 5 gallons to 24 tons of raisins, and the effect of the oil is to coat the fruit with an invisible tasteless film, which appears to have an important stabilizing effect on the consistency of the fruit, has a preservative action and makes the fruit bodies tho of soft unctuous consistency substantially non-adherent so that the fruit remains "free pouring" even after many months of packing in boxes and cartons.

It should not be inferred that the fruit is greasy, for the amount of oil mentioned can not be detected either by the average taste or smell yet contributes to the definite properties mentioned.

This gentle precooling of the seeded fruit followed by rapid terminal cooling has been found very important for any appreciable variation of the method results in a much inferior product, though while the lower member as here shown is of great length it may be bifurcated as indicated in Figure 3 wherein the main elements of the apparatus are indicated and the lower member divided into two of about half length indicated by the numerals H', I' and H", I" respectively, both converging to receive half of the seeded raisins from the seeder F.

After the raisins leave the lower member through gate J, they pass over a shaker K and successively through two revolving screens L and M where they are subjected to an air blast at room temperature through perforated pipes 30 and 31 preferably arranged to blow a current of air through the screen fabric as the raisins are raised against the sides of the screen in rotation.

This aeration evens up the temperature of the raisins throughout and also loosens up any small particles of foreign matter so that it will fall through the screens.

From the final screen the raisins are passed directly to the packages for the market.

Raisins produced by this process are not sticky as are other raisins, they are substantially free flowing at all times, they exude no syrup, are from 16 to 20% larger, of a greater sugar content, and of the very finest flavor and consistency, and while the process has been developed principally for treatment of raisins it is found in whole or part of great advantage when applied to other dried fruits such as currants, prunes, figs, etc. and its use in whole or part with any dried fruits is claimed hereunder.

I claim:

1. The process of treating dried fruit which includes the step of softening the fruit by passing the same over a heated surface for intense local action on the exterior of the fruit while subjecting the fruit to the action of a heated vapor.

2. The process of treating dried fruit which includes the step of softening the fruit by passing the same over a heated surface for intense local action on the exterior of the fruit while subjecting the fruit to the action of a heated vapor of a lower temperature than said heated surface.

3. The process of treating dried fruit which includes the step of passing the fruit rapidly over a surface heated to a high temperature while subjecting the fruit to the action of a heated vapor of a lower temperature than the temperature of said surface, the fruit being kept in agitation and the speed of travel being so rapid as to prevent injurious scorching of the fruit.

4. The process of treating dried fruit which includes heating fruit, then cooling the same, and applying an edible mineral oil to the fruit during the cooling thereof at several stages of the cooling process.

5. The process of treating dried fruit which includes the steps of rapidly heating the fruit and of controlling the cooling thereof, whereby the cooling is gradually effected for a period of time and then more rapidly for a shorter period of time.

6. The process of treating dried fruit which includes the steps of rapidly heating the fruit and of controlling the cooling thereof, whereby the cooling is gradually effected for a period of time and then more rapidly for a shorter period of time and applying an edible mineral oil to the fruit at the beginning of the cooling operation.

7. The process of treating dried fruit which includes the steps of rapidly heating the fruit and of controlling the cooling thereof, whereby the cooling is gradually effected for a period of time and then more rapidly for a shorter period of time and applying an edible mineral oil to the fruit at different stages of the cooling operation.

8. The process of treating dried fruit which comprises rapidly heating the exterior of the fruit while also subjecting the fruit to the action of a hot vapor, gradually cooling the fruit for a time period and then more rapidly cooling the fruit for a succeeding time period.

9. The process of treating dried fruit which comprises rapidly heating the exterior of the fruit while also subjecting the fruit to the action of a hot vapor, gradually cooling the fruit for a time period while exhausting the heated vapor therefrom, then rapidly cooling the fruit by the application of a refrigerant.

10. The process of treating dried fruit which comprises rapidly heating the exterior of the fruit while also subjecting the fruit to the action of a hot vapor, gradually cooling the fruit for a time period while exhausting the heated vapor therefrom, then rapidly cooling the fruit by the application of a refrigerant and of subsequently aerating the fruit to substantially room temperature.

11. In a process for treating dried fruit as specified in claim 8 all of the operations being carried out within three minutes of time.

12. In a process for treating dried fruit as specified in claim 9 all of the operations being carried out within three minutes of time.

13. The process of treating raisins which comprises rapid superficial heating of the raisins while subjecting them to hot vapor, seeding the thus heated raisins, controlling the cooling of the raisins while keeping the raisins in motion and atomizing an edibile oil on the raisins at a stage of the cooling thereof.

14. The process of treating raisins which comprises rapid superficial heating of the raisins while subjecting them to hot vapor, seeding the thus heated raisins, controlling the cooling of the raisins while keeping the raisins in motion and atomizing an edible mineral oil on the raisins at a stage of the cooling thereof.

15. The process of treating dried fruit which includes the steps of rapidly passing the fruit over a surface heated to about 800° F. while at the same time subjecting the fruit to a hot vapor of about 250° F.

16. The process of treating dried fruit which includes the steps of passing the fruit over a surface heated to about 800° F. with constant agitation while at the same time subjecting the fruit to a hot vapor of lower temperature, all within a time period of 20 seconds.

17. The process of treating dried fruit which includes the steps of passing the fruit through a chamber while subjecting it to the action of superheated steam of approximately 250° F. close to atmospheric pressure.

18. A process of treating dried fruit consisting of covering the individual pieces of said dried fruit with a film of petrolatum.

19. A process for treating raisins consisting of subjecting them to a spray of liquid petrolatum.

20. The process of treating dried fruit which includes the step of passing the fruit through a scorching temperature at a speed so rapid as to prevent injurious scorching of the fruit.

21. The process of treating dried fruit which includes the step of passing the fruit through a scorching temperature of about 800 degrees Fahrenheit at a speed so rapid as to prevent injurious scorching of the fruit.

THOMAS W. W. FORREST.